United States Patent [19]
Commanda

[11] 3,810,662
[45] May 14, 1974

[54] RETRACTABLE WHEELS FOR SNOWMOBILES

[76] Inventor: Ephrem Commanda, P.O. Box 1244, Esponola, Ontario, Canada

[22] Filed: Feb. 2, 1973

[21] Appl. No.: 329,165

Related U.S. Application Data
[63] Continuation-in-part of Ser. No. 194,126, Nov. 1, 1971, abandoned.

[30] Foreign Application Priority Data
Nov. 9, 1970 Canada .................................. 97699

[52] U.S. Cl. ...... 280/415 R, 280/491 E, 280/47.32, 180/5 R
[51] Int. Cl. ............................ B60g 3/14, B60d 1/14
[58] Field of Search ......... 180/5 R, 9.3, 9.28; 9/1 T; 280/491, 47.32, 504, 415 R

[56] References Cited
UNITED STATES PATENTS

| | | |
|---|---|---|
| 3,612,566 | 10/1971 | Sholl .................................. 180/5 R |
| 3,123,378 | 3/1964 | Caldwell ..................... 280/47.32 X |
| 3,618,149 | 11/1971 | Christensen ............................ 9/1 T |
| 3,281,874 | 11/1966 | Sholl ........................... 280/47.32 X |
| 3,570,616 | 3/1971 | Tominaga .......................... 180/5 R |
| 3,664,447 | 5/1972 | Kane ................................... 180/5 R |
| 3,480,096 | 11/1969 | Hammitt ............................. 180/5 R |

*Primary Examiner*—Richard J. Johnson
*Attorney, Agent, or Firm*—Cushman, Darby & Cushman

[57] ABSTRACT

A kit of parts for attachment to a snowmobile, to allow the snowmobile to be transported by road without the use of a trailer. The kit of parts includes retractable or removable road wheels carried by suspension means including springs and shock absorbers, and a tow bar by which the snowmobile may be hitched to a car for towing along a road on the road wheels. The suspension means includes a fixed part including the spring and shock absorber means, and a retractable part.

11 Claims, 10 Drawing Figures

RETRACTABLE WHEELS FOR SNOWMOBILES

The present invention relates to means for attachment to the body of a snowmobile, which enables the snowmobile to be towed along a road behind an automobile without the use of a trailer. This application is a continuation-in-part of my application Ser. No. 194,126 filed Nov. 1, 1971, and now abandoned.

At present, snowmobile owners who wish to transport their snowmobiles by road must purchase or hire a trailer for this purpose; various different designs of trailer are already well known. However, the present invention provides means whereby a snowmobile owner can transport his snowmobile by road, without any need for a trailer.

In accordance with one aspect of the invention, there is provided a kit of parts which may be permanently fixed to a snowmobile body, and which provide suspension means for road wheels on which the snowmobile may be towed along a road behind an automobile. The kit of parts includes mounting means for attachment to the snowmobile body, and suspension means for attachment to the mounting means at each side of the snowmobile body, the suspension means including spring and shock absorber means. Each suspension means includes a fixed part, and a wheel support which is retractable or removable and this retractable or removable part carries a stub axle for mounting a freely rotatable road wheel. The wheel supports are selectively fixable in a lowered position, in which road wheels carried by the stub axles of the wheel supports are in contact with the ground to support the snowmobile track clear of the ground, and the wheel supports are also fixable in a raised position in which the road wheels carried by the stub axles are held clear of the ground on which the snowmobile track rests. The kit of parts also includes hitch bar mounting means whereby a hitch bar may be attached to the snowmobile, to allow this to be towed along a road, on the road wheels mounted on the stub axles, hitched behind an automobile. The term "fixed" as applied to the suspension means will be understood as meaning that this part is not retractable, although this part of the suspension means will of course have limited, resilient movement to accommodate movement of the road wheels as they pass over bumps.

U.S. Pat. No. 3,570,616 to Yamaha (which issued after the filing date of my Canadian Pat. application No. 097,699) shows wheels for fitting to a snowmobile which are stated to serve the purpose of elevating the snowmobile track above the ground, enabling it to be warmed up in advance of operation, and enabling it to be moved over snowless terrain. However, this patent seems to be concerned only with moving the snowmobile short distances, and there is no suggestion in this patent that the snowmobile could be towed behind an automobile. The wheels shown are too small and too narrowly placed for this to be practical, and no spring or shock absorber means are shown. Furthermore, there is no means shown for hitching on to an automobile, and no means is shown for guiding the front wheels.

U.S. Pat. No. 3,612,566 to Sholl, also shows road wheels for a snowmobile. However, this does not include fixed suspension means coupled to a retractable or removable wheel support; instead the whole unit including the suspension means must be removed before the snowmobile can be used in the normal manner.

The suspension means preferably makes use of a combined shock absorber/coil spring unit which has its inner end pivotally attachable to the mounting means, the outer, free end of such unit being attached to the outer end of a link which link has its inner end pivotally attached to the mounting means at a location spaced from the inner end of the shock absorber unit. Accordingly, the shock absorber unit and the link form two sides of a triangular type structure, the third side of which is constituted by the mounting means. The link is preferably substantially horizontal, so that compression of the shock absorber unit causes substantially vertical movement of the free end of the link to which the retractable part of the suspension means is attached.

The free end of the suspension means, which may for example be constituted by an extension of the outer end of the link, may be provided with a shaft extending fore-and-aft of the snowmobile, and the retractable part may include a sleeve which is mountable on the shaft in two different positions. The sleeve carries a wheel support member, which member carries at its outer end a stub axle for a road wheel, and means are provided for holding the sleeve on the shaft selectively in a first position in which the wheel support member extends downwardly, so that a road wheel carried by the support member can contact the road to support the snowmobile clear of the ground, and in a second position in which the road wheels are raised clear of the ground contacted by the snowmobile track.

The invention also includes snowmobiles as converted by attachment of the kit of parts to the snowmobile body.

The invention will now particularly be described with reference to the accompanying drawings, which show a preferred embodiment of the invention, and in which:

FIG. 1 shows a side view of a snowmobile converted by attachment of a kit of parts in accordance with the invention, FIG. 2 shows an enlarged view of the rear part of the snowmobile, to which road wheels have been attached, FIG. 3 shows a front view of two of the parts used to convert the snowmobile, FIG. 4 shows a top view of the parts shown in FIG. 3, FIG. 5 shows a front view of the wheel support member, FIGS. 6 and 7 show, diagrammatically, rear views of the snowmobile with the road wheels respectively in the lowered and the retracted positions.

Figure 1:
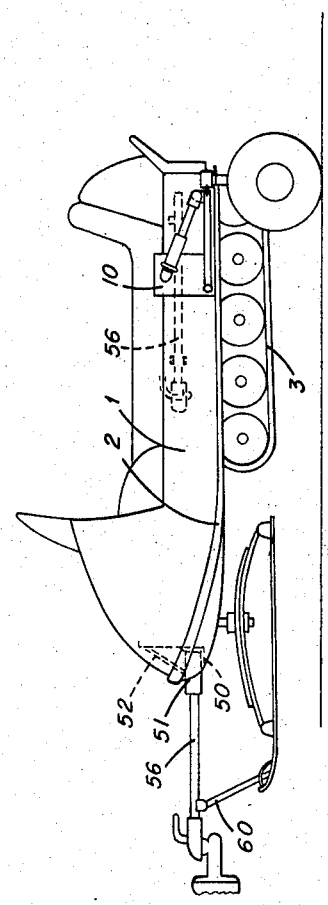

Referring to the drawings, FIG. 1 illustrates a typical snowmobile having a body 1 with running board 2 and a snow engaging track 3, and converted by attachment of a kit of parts in accordance with the invention.

Figure 2:
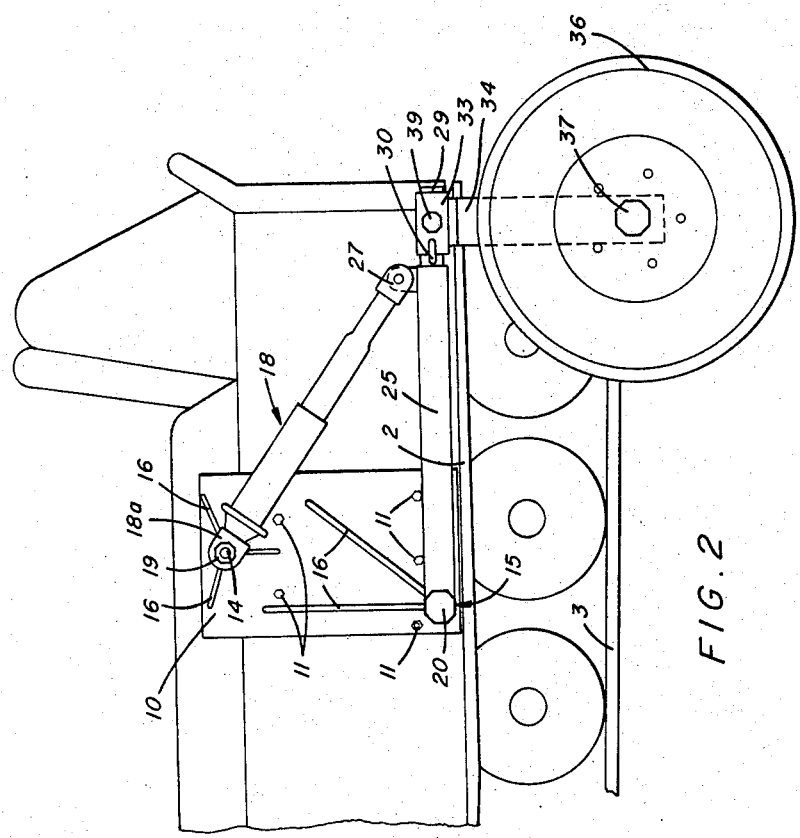
Figure 7:
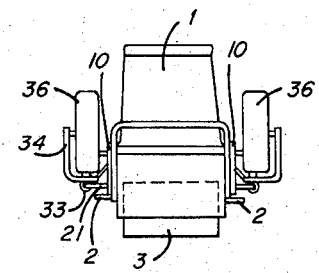
Figure 6:
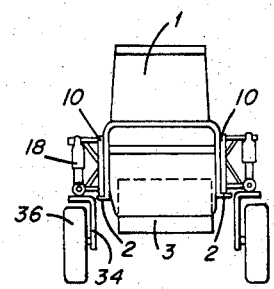

The kit of parts attached to the snowmobile body includes two steel mounting plates 10, one of which is attachable to each side of the snowmobile body as shown, particularly in FIGS. 2, 6 and 7. The plates are attachable to the body as shown by means of four bolts 11 which are passed through holes in the mounting plates and corresponding holes drilled in the snowmobile body. These plates fit above the running board 2.

Figure 3:
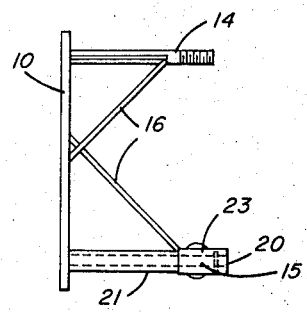
Figure 4:
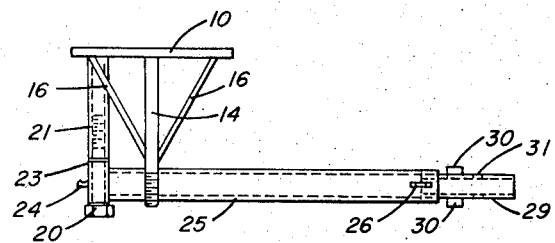

As particularly shown in FIGS. 3 and 4, each mounting plate 10 has an upper pivot pin 14, and a lower pivot pin 15, which project perpendicularly from plate 10. The upper pivot pin 14 is in the form of a rod having a screwed end, and which is braced by rods 16 attached between the plate and a part of the pivot pin near to the screwed end. The outer end of the rod 14 is adapted to receive the forward lug 18a of a combined telescopic shock absorber/coil spring unit 18. This unit 18 includes the piston means of a hydraulic shock absorber, and also a coil compression spring, such units being well known and generally available. The unit is held in place on rod 14 by a nut 19 engaging the screwed end of the rod.

The lower pivot pin 15 is constituted by the shank of a bolt 20, which is screwed into the end of a support tube 21 having its inner end welded to the plate 10, and being braced by rods 16 similar to those which brace rod 14. A sleeve 23 is rotatable on the shank of bolt 20, this being provided with a grease nipple 24. A tube 25 has one end (hereinafter referred to as the inner end) welded to the side of sleeve 23, and extends perpendicularly of this sleeve in the fore and aft direction relative to the snowmobile. The outer, free end of the tube 25 is provided with a vertical welded lug 26, having a transverse bore, and this lug is connected by a pivot pin to a similarly bored bracket 27 at the outer end of the shock absorber unit 18. Thus, tube 25 forms in effect a link connecting the free end of the shock absorber unit to a point (pivot 15) on the mounting means which is displaced from the pivotal mounting of the inner end of the shock absorber unit, so that the link and shock absorber form two sides of a triangular structure of which the mounting plate is the third side. The link 25 is approximately horizontal, so that deflection of the end of the link, attendant on compression of the shock absorber unit, is approximately vertical.

The outer, free end of tube 25 is further provided with an axial extension in the form of a tubular shaft 29. The inner end of this shaft is provided with two horizontally disposed lugs 30, and the shaft also has a horizontal drilling 31 through its center. The lugs 30, and the drilling 31, are for the purposes of fixing in position a retractable or removable part of the suspension means, which will now be described.

Figure 5:
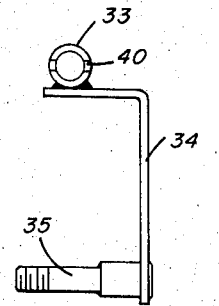

This retractable or removable part includes a sleeve 33, slidable on the shaft 29, to the side of which sleeve is welded a wheel support member 34 in the form of an angled steel bracket, the shape of which is shown in FIG. 5. The support member 34 has welded to its lower end a stub axle 35, adapted to receive the bearing of a pneumatic tired road wheel 36, which is held by a nut 37 screwed onto the outer screw threaded end of the stub axle. The sleeve 33 has a central bore 39, corresponding to the drilling 31 in the shaft 29, and also has two slots 40 at its forward end, which fit over the lugs 30 as shown in particular in FIG. 2. A removable bolt is provided for inserting through the bores of the sleeve and shaft, to hold the sleeve axially in position, and in this position the lugs 30 fit into the slots at the forward end of the sleeve to prevent rotation of the sleeve.

Figure 8:
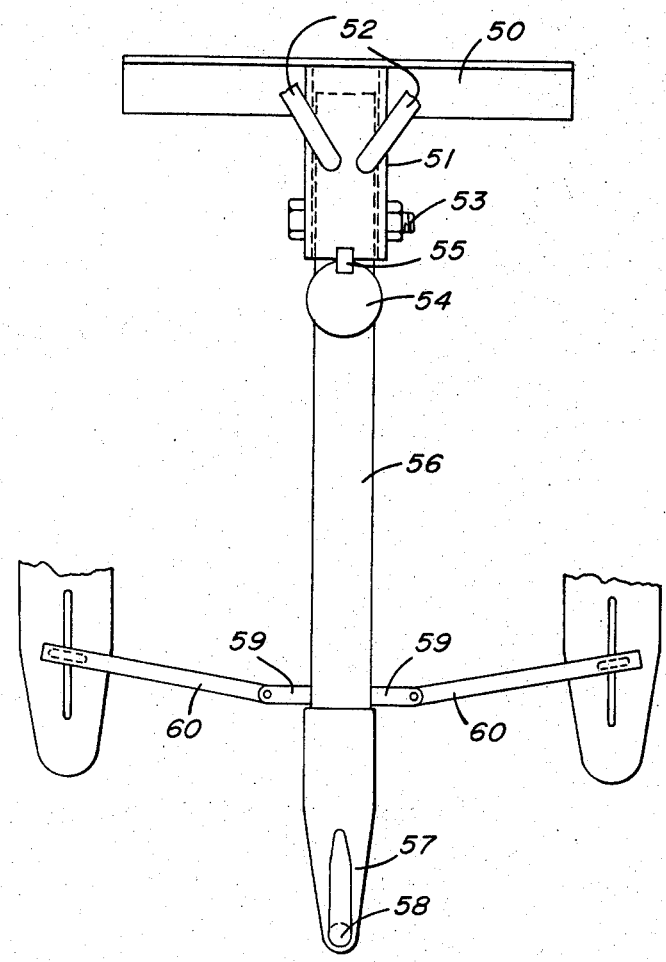
FIG. 8 shows a top view of the hitch bar and the hitch bar mounting means.

FIG. 8 shows details of the hitch bar mounting means at the front end of the snowmobile. These mounting means include an angle bracket 50 welded at the front end of the snowmobile. The location and nature of this bracket 50 will naturally vary with the design of snowmobile, but in the example shown this bracket is welded across a chassis member just inside the front of the body, and just below the bumper. The ends of the bracket are welded to parts which pivotally support the skis of the snow mobile. A tubular socket member 51 is welded to the center of the bracket 50, and extends forwardly therefrom, under the bumper of the snowmobile, and a small distance in front of this. The socket member is braced by rods 52 having their lower ends welded near the front end of the socket member, and their rear ends welded to the body above the bracket 50.

The socket member has a transverse bore for receiving a retaining bolt 53. Additionally, the front end of the socket member carries a pivotal cover 54, which is movable from a raised position (shown) in which it is clear of a hitch bar inserted into the socket, to a lowered, closed position in which it fits over the open end of the socket and prevents ingress of snow or other foreign matter, into the socket. A spring 55 is provided to hold the cover in the closed position.

The hitch bar itself comprises a steel tube 56, which is sized to fit closely within the socket member 51, and which has a transverse bore for receiving the retaining bolt 53. The tube 56, and the socket member and supporting means, are sufficiently strong that the front end of the snowmobile can be supported, for towing, by the hitch bar when inserted into the socket member. The forward end of the hitch bar has a fitting 57 which is welded over the end of the tube 56, and which has, under its front end, a socket 58 of standard form for fitting over the ball hitch attachment of an automobile.

The length of the hitch bar means is of course sufficient that the skis of the snowmobile are held well clear of the rear of an automobile to which the snowmobile is hitched. Near to the front end of the tube 56 is welded two lugs 59, to which are pivoted bars 60 having clips at their outer end. When the snowmobile is prepared for towing, this bar is used to secure the ends of the skis to the hitch bar, to prevent swinging of the skis as the snowmobile is being towed.

The kit of parts as sold will normally include the mounting with its attachments, the shock absorber unit 18, and link 25, and the sleeve 33 with the wheel support member 34, carrying the stub axle, two such assemblies being required for each snowmobile. The kit would also include the hitch bar mounting means, namely the bracket 50 and parts attached thereto, for welding onto the chassis or body of the snowmobile in the manner described. The road wheels, and the hitch bar would also generally be included in the kit of parts, but it will be noted that the road wheels are a readily available item which customers might prefer to select themselves and the hitch bar is also a simple item which many customers might make for themselves. The snowmobile is converted, in accordance with the invention, by bolting on the mounting plates 10 onto each side of the body, and welding in place the bracket 50 carrying the hitch bar mounting means, which are also secured by the reinforcing rods 52.

For ordinary use as a snowmobile, the sleeve 33 carrying the wheel support member 34 is located on the shaft 29 in such position that the wheel support member extends upwardly as shown in FIG. 7, the sleeve being retained in place by a bolt inserted through the transverse holes 31 and 39 in the shaft 29 and sleeve 33, and by the engagement of the lugs 30 in the slots 40 at the forward end of the sleeve. In this position the wheels and all the suspension means are clear of ground or snow on which the snowmobile track rests, and so do not interfere with normal snowmobile use. For such use, the hitch bar 56 is of course removed, and may be carried either on clips alongside the snowmobile body, for example as indicated in FIG. 1, or may alternatively be stored in the car trunk.

For transporting the snowmobile by road, the rear end of the snowmobile would be raised up, and the bolts securing the sleeves 33 in place would be removed, the sleeves 33 being pulled rearwards until the slots 40 are clear of the lugs 30, and each sleeve is then rotated until the wheel support member 34 is in the downwardly extending position as shown in FIG. 6. In this position, the slots 40 of the sleeve again engage the lugs 30, so that the sleeve can be pushed forward and secured again by the pins. In this position the road wheels 36 are in contact with the ground and support the snowmobile track well clear of the ground. Next, the hitch bar 56 is inserted into the socket member 51, the cover having previously been removed. The hitch bar is secured by the pin 53. The bars 60 are then secured to the skis, and the socket of the front end of the hitch bar is attached to the ball hitch attachment of the automobile, and the snowmobile is ready to be towed along a road.

It may be noted that when the members 34 are then lowered as in FIG. 6, these are just clear of the outside edges of the running boards 2, the members 14 and 21 being dimensioned to ensure this condition.

As an alternative to mounting the wheels in the retracted position as shown in FIG. 7, for ordinary snowmobile use the sleeve 33, and the parts attached thereto including the wheels may be removed entirely from the shaft 29, and for example these parts may be carried in the trunk of the automobile while the snowmobile is in normal use.

Instead of plate 10 being secured entirely by means of bolts 11, vertical members may be welded to opposite sides of the snowmobile body, such as to provide retaining grooves for the edges of plates 10, so that these plates can be held firmly by only one or two bolts. Instead of bolts, a screw clamp may be used, the screw lying in a plane parallel to the snowmobile sides and being arranged to act obliquely on plates 10 so as to both limit upward movement of these plates and to press them firmly into the brackets at one side.

This modified arrangement is particularly useful where it is desired to tow two snowmobiles side-by-side. In such a case, the snowmobiles may be connected together by a special bracket comprising two plates similar to plates 10, but not having the projecting pivot pins. The two plates would be firmly fixed together, in a parallel arrangement, so that when appropriately bolted to the innermost snowmobile sides this bracket would hold the sides together and in alignment. The outermost side of each snowmobile would be provided with a retractable wheel assembly of the type already described, but capable of taking a heavier load since in this case only two wheels would take the weight of both the two snowmobiles. A special hitch bar would also be provided, having a first portion extending rearwardly from the hitch connection for the vehicle, a cross-bar fixed at its centre to the rear of the first portion, and two rear portions of adjustable length extending backwards from the ends of the cross-bar and aligned with, and connectable to, the snowmobile hitch bar mounting means of the type already described on the front end of each snowmobile. The hitch bar would also be provided with means similar to bars 60 for keeping the skis in place.

Figure 9:
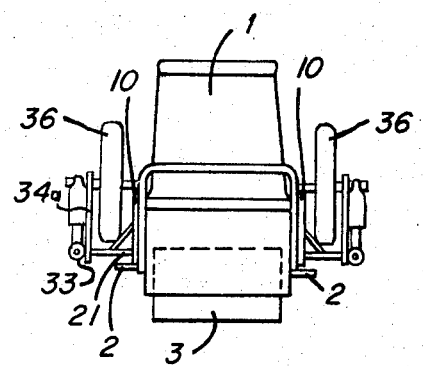
FIGS. 9 and 10 show rear views of a modified construction, with the wheels respectively raised and lowered.
Figure 10:
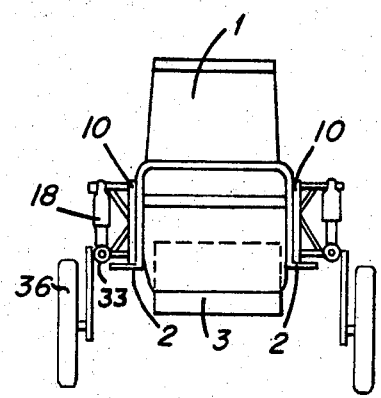

FIGS. 9 and 10 show a modified and preferred form of the retractable wheel assemblies. It will be seen from these figures that the wheel support comprised by the sleeve 33, member 34, and stub axle 35, is modified compared to the arrangement shown in FIG. 5 so that the sleeve 33 is welded to the side of a vertical member 34a, corresponding to the normally vertical portion of the member 34 shown in FIG. 5. The arrangement is such that road wheels carried by the axles 35, in the operative position shown in FIG. 10, are positioned outwardly of the axis of the sleeve, which is the pivot axis of movement of the wheel support. Conversely, in the retracted position of the wheels these are positioned inwardly of this axis. By this arrangement, it is provided that in the operative, travelling condition the wheels are given a wide wheel base, and in the retracted position they are stowed close to the sides of the snowmobile.

It will be apparent that the sleeve 33 may be positioned in various different positions relative to the stub axle, to give any desired relationship between the widths between the wheels in the operating and retracted positions.

In another modification of the design, the upper and lower pivot pins 14 and 15 are replaced by a single angled arm which extends outwardly from each plate 10. This arm has a first portion extending perpendicularly from plate 10, and a second portion extending vertically down from the outer end of the first portion. The outer end of the first portion carries lugs which support the upper end of the spring/shock absorber unit, and the lower end of the second portion is bifurcated and pivotally holds the inner end of the link 25. This construction eliminates the need for a second pivot pin to be attached to the plate; the angled arm is connected to the plate by rigid bracing means.

I claim:

1. A kit of parts for attachment to a snowmobile having a body and a snow engaging track, said kit comprising:

mounting means for attachment at fixed positions to a side of the snowmobile body, suspension means for permanent attachment to said mounting means, said suspension means including a part fixed in relation to the mounting means and a wheel support movable relative thereto, said fixed part including spring and shock absorber means and said fixed part having one end attachable to the mounting means and having a free end capable of sprung vertical movement relative to the mounting means, the mounting means and suspension means being such that when assembled and attached to a snowmobile body the said fixed part of the suspension means is spaced outwardly from the side of the snowmobile body and said one end thereof remains at all times stationary relative to the snowmobile body, said wheel support being mounted on the free end of said fixed part and carrying a stub axle for mounting a freely rotatable road wheel, detachable connection means for fixing the wheel support on said free end in an operative position in which wheels carried by the stub axles can contact the ground to support the snowmobile track clear of the ground, said connection means being detachable for removal of the wheel support from this position on the fixed part without movement of said fixed part of the suspension means, said kit also including hitch bar mounting means whereby a hitch bar may be attached to the snowmobile to enable the snowmobile to be towed along a road with the road wheels supporting the snowmobile track clear of the ground.

2. A kit of parts according to claim 1, wherein said detachable connection means is arranged to allow temporary fixing of said wheel support in a position well clear of the ground.

3. A kit of parts according to claim 1, wherein said mounting means includes two plates attachable to opposite sides of the snowmobile body, each plate having two pivot pins, and wherein said fixed part of the suspension means includes a combined shock absorber/coil spring unit pivotally attachable to one of said pivot pins and a link pivotally attachable to the other pivot pin, said unit and said link being pivotally attachable together at their outer ends remote from the pivot pins, the wheel support being attachable to the outer end of said link which outer end constitutes said free end of said fixed part.

4. A kit of parts according to claim 3, wherein an extension of said link is in the form of a shaft, and wherein said wheel support includes a sleeve mountable on said shaft selectively in first and second positions, means being provided for holding the sleeve on the shaft selectively in said first position, in which the road wheels carried by the stub axles can contact the ground to support the snowmobile track clear of the ground, and in said second position in which the road wheels are raised clear of ground contacted by the snowmobile track.

5. A kit of parts according to claim 1, wherein the said free end is provided with a shaft extending in the fore-and-aft direction of the snowmobile, and in which the wheel support includes a sleeve mountable on said shaft in first and second positions, means being provided for holding the sleeve on the shaft selectively in said first position, in which the road wheels carried by the stub axles of each wheel support can contact the ground to support the snowmobile track clear of the ground, and in said second position in which the road wheels are raised clear of ground contacted by the snowmobile track.

6. A kit of parts according to claim 1, wherein said connection means allows pivotal movement of the wheel support on said free end about a pivot axis extending fore-and-aft of the snowmobile between said operative position and a raised position, and wherein said stub axle is positioned relative to the wheel support such that in the operative position of the wheel support the road wheels are positioned outwardly of said pivot axis, and such that in the raised position said road wheels are positioned inwardly of said pivot axis.

7. A kit of parts according to claim 1, for attachment to two snowmobiles in side-by-side relation, including mounting means with associated suspension means, wheel support, and connection means for the outer sides of the two snowmobiles, and a connecting bracket for securing together the innermost sides of the two snowmobiles.

8. A kit of parts for attachment to a snowmobile having a body and snow engaging tracks, said kit comprising:

mounting means for attachment to the snowmobile body, suspension means for attachment to said mounting means at each side of the snowmobile body, said suspension means including a fixed part and a retractable part, said fixed part including spring and shock absorber means and having one end attachable to the mounting means and having a free end, said free end being provided with a shaft extending in the fore-and-aft direction of the snowmobile said retractable part including a sleeve mountable on said shaft in first and second positions, the said retractable part also including a wheel support member carried by said sleeve, the outer end of said wheel support member carrying a stub axle for a road wheel, means being provided for holding the sleeve on the shaft selectively in said first position, in which the wheel support member extends downwardly so that road wheels carried by the support members can contact the road to support the snowmobile track clear of the ground, and in said second position in which the road wheels are raised clear of ground contacted by the snowmobile track.

9. A snowmobile having a body and snow engaging tracks, and including:

mounting means attached at fixed positions to each side of the snowmobile body, suspension means attached to said mounting means, said suspension means including a part fixed in relation to the mounting means and a wheel support movable relative thereto, said fixed part including spring and shock absorber means and said fixed part having one end attached to the mounting means and having a free end capable of sprung vertical movement relative to the mounting means, and said fixed part being spaced outwardly from the sides of the snowmobile body and said one end remaining at all time stationary relative to the snowmobile body, said wheel support being mounted on the free end of said fixed part and carrying a stub axle for mounting a freely rotatable road wheel, detachable connection means for fixing of the wheel support on said free end in an operative position in which wheels carried by the stub axles can contact the ground to support the snowmobile track clear of the ground, said connection means being detachable for removal of the wheel support from this position on the fixed part without movement of said fixed part of the suspension means, the snowmobile also having hitch bar mounting means whereby a hitch bar may be attached to the snowmobile to enable the snowmobile to be towed along a road with the road wheels supporting the snowmobile track clear of the ground.

10. A snowmobile according to claim 9, wherein said connection means allows pivotal movement of the wheel support on said free end about a pivot axis extending fore-and-aft of the snowmobile between said operative position and a raised position, and wherein said stub axle is positioned relative to the wheel support such that in the operative position of the wheel support the road wheels are positioned outwardly of said pivot axis, and such that in the raised position said road wheels are positioned inwardly of said pivot axis.

11. A snowmobile having a body and a snow-engaging track, and including:

suspension means attached to each side of said body, said suspension means including spring and shock absorber means, said suspension means also including a retractable part which part carries a stub axle for mounting a freely rotatable road wheel, said spring and shock absorber means being included in a combined shock absorber/coil spring unit which unit has an inner end pivotally attached to the snowmobile body, the outer end of each said unit being attached to the outer end of a link, the inner end of which link is pivotally attached to the body at a location spaced from the inner end of the shock absorber/spring unit, and wherein an extension of said link is in the form of a shaft, and said retractable part including a sleeve mountable on said shaft in first and second positions, the said retractable part also including a wheel support member carried by said sleeve, the outer end of said wheel support member carrying said stub axle, means being provided for holding the sleeve on the shaft selectively in said first position, in which the wheel support member extends downwardly so that road wheels carried by the support members can contact the road to support the snowmobile track clear of the ground, and in said second position in which the road wheels are raised clear of ground contacted by the snowmobile track, the snowmobile also having hitch bar mounting means, whereby a hitch bar may be attached to the snowmobile to enable the snowmobile to be towed along a road with the road wheels supporting the snowmobile track clear of the road.

* * * * *